United States Patent [19]

Mansfield

[11] 4,131,093
[45] Dec. 26, 1978

[54] INTERNAL COMBUSTION ENGINES

[75] Inventor: Wilfred P. Mansfield, Chandlers Ford, England

[73] Assignee: National Research Development Corporation, London, England

[21] Appl. No.: 632,662

[22] Filed: Nov. 17, 1975

Related U.S. Application Data

[63] Continuation of Ser. No. 478,885, Jun. 12, 1974, abandoned.

[30] Foreign Application Priority Data

Jun. 21, 1973 [GB] United Kingdom ............... 29500/73

[51] Int. Cl.² .............................. F01P 1/06; F01P 9/04
[52] U.S. Cl. ................................ 123/41.85; 123/41.57; 123/41.82 R
[58] Field of Search ................. 123/41.85, 41.77, 41.3, 123/41.42, 41.55, 41.57, 41.82 R

[56] References Cited

U.S. PATENT DOCUMENTS

| 566,263 | 8/1896 | Wolf | 123/41.77 |
|---|---|---|---|
| 1,083,265 | 12/1913 | Baumann | 123/41.77 |
| 1,436,976 | 11/1922 | Sherbondy | 123/41.85 |
| 1,774,928 | 9/1930 | Land | 123/41.85 |
| 3,115,126 | 12/1963 | Spencer | 123/41.85 |
| 3,155,084 | 11/1964 | Grim | 123/41.77 |
| 3,353,522 | 11/1967 | Ley | 123/41.77 |
| 3,377,996 | 4/1968 | Kotlin | 123/41.85 |
| 3,420,215 | 1/1969 | Seifert | 123/41.77 |
| 3,491,731 | 1/1970 | Dinger | 123/41.77 |
| 3,554,171 | 1/1971 | Herschmann | 123/41.57 |
| 3,741,173 | 6/1973 | Christian | 123/41.57 |
| 3,765,384 | 10/1973 | Barnard | 123/41.57 |
| 3,769,948 | 11/1973 | Feichtinger | 123/41.85 |

FOREIGN PATENT DOCUMENTS

45936 3/1915 Sweden .................... 123/41.57

Primary Examiner—Charles J. Myhre
Assistant Examiner—D. Reynolds
Attorney, Agent, or Firm—Cushman, Darby & Cushman

[57] ABSTRACT

An internal combustion engine cooled by the forced passage of fluid through ducts, in which such ducts are confined to the individual regions of the engine liable to overheat, the remaining parts of the engine which in operation rise only to acceptable temperatures being left free from such ducts. The invention includes structures to resist separation of the engine components under firing loads and to improve rigidity.

5 Claims, 11 Drawing Figures

INTERNAL COMBUSTION ENGINES

This is a continuation, of application Ser. No. 478,885, now abandoned filed June 12, 1974.

This invention relates to internal combustion engines, and especially diesel engines, with ducted cooling systems, that is to say systems in which the running engine is cooled by the flow near its hot surfaces of driven fluid, this flow taking place in confined passages. Hitherto it has been customary to form the cylinder block and the associated part of the cooling system as a single casting with a box-like exterior and the cylinders within it, spaces for flowing water being left between. Such constructions have had disadvantages. The castings have usually been heavy and bulky. The outer walls of the box have tended to vibrate readily under the action of the forces generated within it. The flow of heat into the water passing through the spaces has often been very great, callling for large fans, radiators and pumps to dissipate this heat later to the atmosphere. Also the box has served to contribute necessary mechanical strength to the engine as a whole, but it has often performed this task imperfectly because of conflict with its other intended functions.

The present invention is based upon two related discoveries. First, that a far less massive and extensive cooling systems will suffice to prevent unacceptably high temperatures in most internal combustion engines, and that such temperatures are only likely to occur in critical regions of the cylinder head and of each cylinder, e.g. around its upper end. Second that a more efficient way of giving the engine adequate mechanical strength may also result in a construction that generates less sound.

This invention comprises an internal combustion engine including a ducted cooling system concentrating cooling in the more critical regions of the cylinders, and the space and material conventionally required by the box and water spaces already mentioned may be used to accommodate and form new structures specifically intended to strengthen and rigidify the engine structure.

The cooling system may comprise ring-shaped ducts for flowing liquid formed in the upper walls of the cylinders, the ducts being co-axial with and closely surrounding the cylinder bores. The engine may also as usual include inlet and exhaust ports and valves mounted in the cylinder head, and the cooling system may also include similar ducts in the head, these ducts being co-axial with and closely surrounding the valve seats and valve guides and, in the case of a diesel engine, the end of the fuel injector adjacent the combustion chamber. The strengthening and rigidifying structures may be in the form of ribs, fins or other suitable members attached to or integral with the outer surfaces of the cylinders and head so as to make them more rigid.

The engine will typically comprise a cylinder block, a cylinder head attached to one end of that block, and crank bearing caps attached to the block at substantially the opposite end, and the strengthening and rigidifying structures may essentially be tie-bars between the head and the caps, capable of taking the strain of the gas pressure forces that build up within the engine and tend to separate the head and caps from the block. By taking this strain the tie-bars thus diminish the strains, especially bending moments, that these forces would otherwise set up in the main body of the cylinder block itself. At least parts of these tie-bars may be attached to, or formed as reinforced parts of the cylinder block, thus enhancing its rigidity and diminishing its capability to generate sound. In particular, parts of the tie-bars may be formed as ribs or fins on or attached to the cylinder block. The ribs or fins should at least include some running parallel to the general direction of the crankshaft, and preferably others at an angle to them, e.g generally parallel to the axes of the cylinders. Further stiffener members may also include connecting walls directly linking the structural walls of adjacent cylinders, and some of the ribs or fins may be supported from these connecting walls.

The invention is further defined by the claims that conclude this specification, and will now be described, by way of example, with reference to the accompanying drawings in which:

In the engine of FIGS. 1-7, transversely deep fins 1 are used all round to impart great rigidity in the transverse plane. The arrangement also constitutes an efficient load-carrying structure. Bosses 2, of which two are seen in section at the top of fins 1 in FIG. 2, carry some of the studs 3, by which the cylinder head is attached to the rest of the engine structure. At their lower ends the fins merge with robust portions of the crankcase 5 adjacent the bores 6 formed in the crankcase to receive the studs 7 by which rigid main bearing caps 8 are attached to the structure. The gas pressure forces between the cylinder head 4 and the bearing caps 8 are thus carried directly by the fins 1 acting as strong tie-bars. Thus direct tensile strain resulting in vibration of the whole cylinder block is minimised and bending strain due to the stud forces is minimised both because of the direct loading and because of the rigidity of the deep fins.

Bending of the cylinder block in horizontal planes is resisted by the head 4, by the upper deck 9 of the block, by the upper part of the crankcase 5 and by one or more horizontal fins (e.g. 10 and 11) between the two. One such horizontal fin (11) can advantageously be placed at the level at which the lower end of the piston 12, shown in outline in FIG. 6, strikes against the cylinder wall just after top dead centre.

Figure 1:
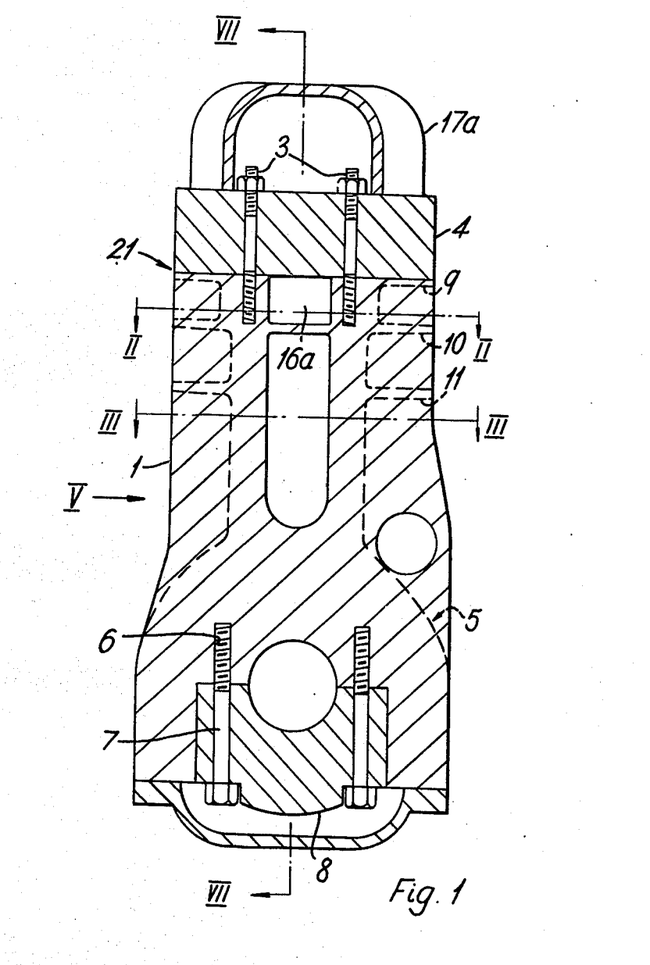
FIG. 1 is a diagrammatic section through a diesel engine, in a plane at right-angles to the crank axis and on the line I—I in FIG. 2.
Figure 2:
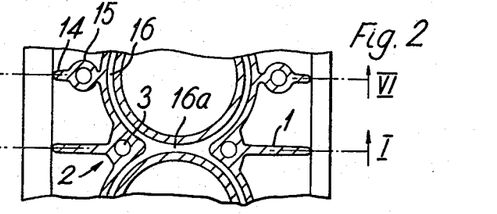
FIG. 2 is a section on the line II—II in FIG. 1.
Figure 3:
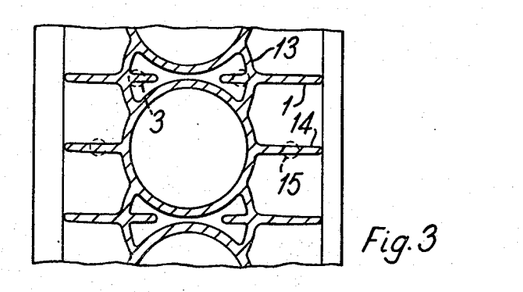
FIG. 3 is a section on the line III—III in FIG. 1.

FIG. 3 shows that the walls of the several cylinders are linked by short curved connecting walls 13 to the mid point of which the fins 1 seen in FIGS. 1 and 2 are attached. Tying the cylinders together by such walls of course adds to the rigidity of the engine structure in the transverse vertical plane. Also, by providing further support to the cylinder head stud bosses 2 and strengthening the fins below them, such walls reduce both tensile and bending strains. The stud positions relative to the walls are indicated by the small broken-line circles on part of FIG. 3.

The connecting walls also increase longitudinal rigidity, both in the plane of FIG. 3 and in the vertical longitudinal plane, by forming two continuous longitudinal walls comprising the connecting walls and parts of the cylinder walls. Furthermore, the normally freely vibrating cylinder walls are themselves stiffened by the connecting walls and by one another. FIG. 2 also shows further stiffening fins 14 projecting from the mid-points of the cylinder walls (i.e. in line with the cylinder axis), adding extra stiffness to the whole structure including the cylinders and carrying the remaining cylinder head stud bosses 15. Piston impact is most likely to occur on that part of the cylinder wall to which these further stiffening fins 14 are attached, and at the level of the horizontal fins 11 to which the cylinders, the connecting walls 13, and the fins 1 and 14 are all joined; thus the amplitude of the vibrations produced by piston slap and, in the case of diesel engines the resultant "diesel knock", which is mainly due to piston slap, should be far less than normal. The spaces between the fins may be filled with noise-absorbing material, and the "grid" of fins on the outer surface of the cylinders and the upper crankcase also serves to break up what would otherwise be a relatively large and regular area of vibratable surface, capable of radiating sound.

The cooling system for the engine shown in FIG. 1 comprises a cylinder water jacket consisting of a narrow annular passage around the upper end of each cylinder. The location of the passage will be close to the hot combustion zone of the cylinder. In axial depth it will in general be less deep than the combustion zone, and the precise location of the passage will depend on individual engine requirements. The real requirement of the jacket is that it should cool parts of the cylinder wall that tend to overheat, but avoid cooling parts that do not. The section through this passage 15 and the remaining stud bosses is shown in FIG. 2. The detachment of the cylinder wall from the surrounding structure in this region ensures that this portion of the cylinder bore, in which the piston rings must seal against the highest pressures, is not distorted by stud loads transmitted to the cylinders. Water enters each annular passage from an aperture in one side face of the cylinder head, flows round the jacket across the engine and leaves via another aperture in the other side of the cylinder head. The annular passages cooling adjacent cylinders may meet, as at 16a (FIG. 2). The arrangement of inlets and outlets is shown in more detail in FIGS. 9 and 10. The remaining and much greater part of the length of each cylinder, below the level of passage 16 and above that of the crankcase 5, rises in temperature during operation but not excessively, and so is simply left exposed without ducted cooling.

Figure 4:
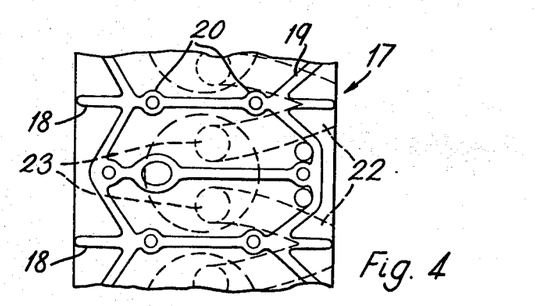
FIG. 4 is a diagrammatic plan view of part of the cylinder head of the same engine.
Figure 5:
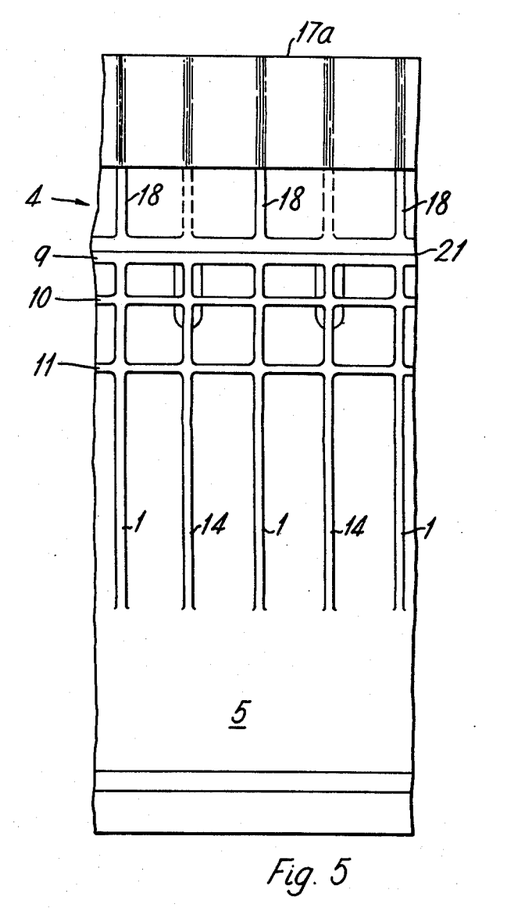
FIG. 5 is a side elevation taken in the direction of the arrow V in FIG. 1.
Figure 6:
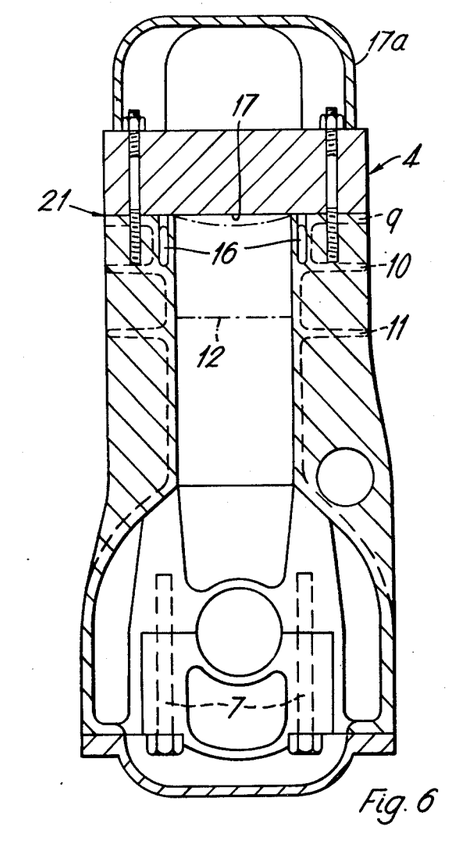
FIG. 6 is a section on the line VI—VI in FIG. 2.

The cylinder head, part of which is shown in plan view in FIG. 4 with the valve cover 17a removed, essentially comprises a plate 17 with respectively transverse and oblique fins 18, 19 projecting upwards from it. The design shown is to suit the cylinder block of FIG. 1. The transverse fins 18, of which there are two per cylinder in this example, are in line with the cylinder block fins 1 and 14 and are enlarged locally by bosses 20 to accommodate the cylinder head studs 3. These points are braced by the oblique fins 19 which add to the stiffness of the plate 17 in the longitudinal direction and help to distribute the stud loads uniformly on the joint 21 between the cylinder head and the cylinder block. Gas exhaust passages 22, indicated by broken lines, pass from the exhaust ports 23 between the transverse fins 18 and through local apertures in the lower part of the oblique fins 14 on one side of the head.

Figure 8:
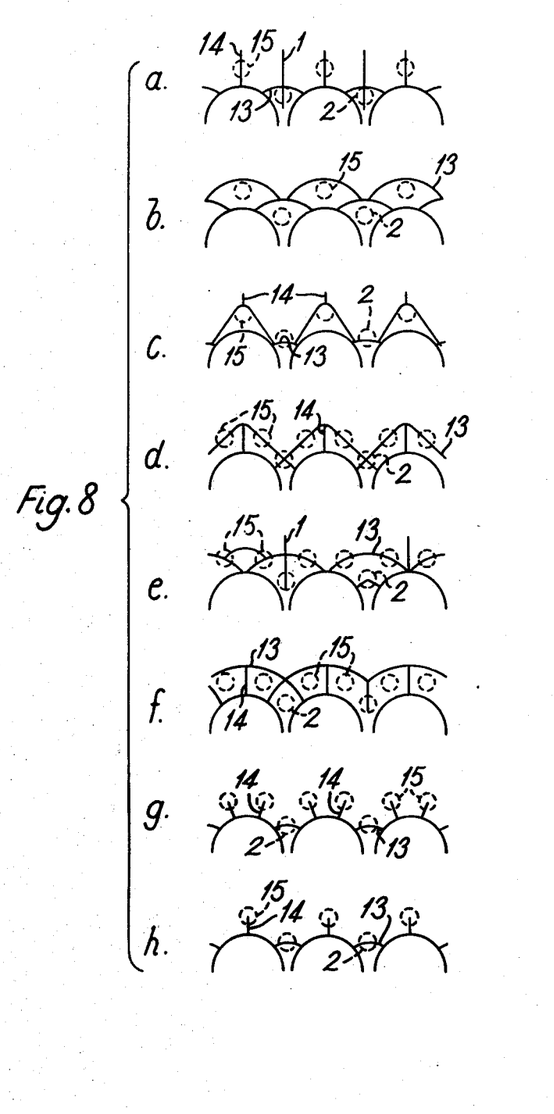
FIG. 8 shows several alternative constructions (a) to (h) in diagrammatic sectioned plan.

FIG. 8(a) shows diagrammatically the arrangement of cylinder connecting walls 13 and vertical fins 1, 14 shown in FIGS. 1–3. The remaining parts of FIG. 8 show alternative arrangements. Corresponding alternative arrangements of the cylinder head fins 18, 19 are possible. The positions of the cylinder head stud bosses 2, 15 at the top of the cylinder block are indicated.

In the arrangement of FIG. 8(a) the outward projecting portion of the fins 1 between cylinders may be tapered, thus easing casting, or otherwise reduced in section to produce a better balance of material about the position of studs 3 and thus further reduce bending moment. The connecting walls 13 between the cylinders may be placed so that they pass through the stud positions or inside them. By suitable choice of fin and wall position and thickness, the bending moment exerted on the cylinder block and head by the stud load can be made negligible, and this principle can be applied to all the arrangements shown in FIG. 8, in which it will be seen that some of the fins 14, although projecting from the cylinder walls, do not lie in the transverse plane of the cylinder axes. The same applies to the corresponding stud bosses 15.

Figure 7:
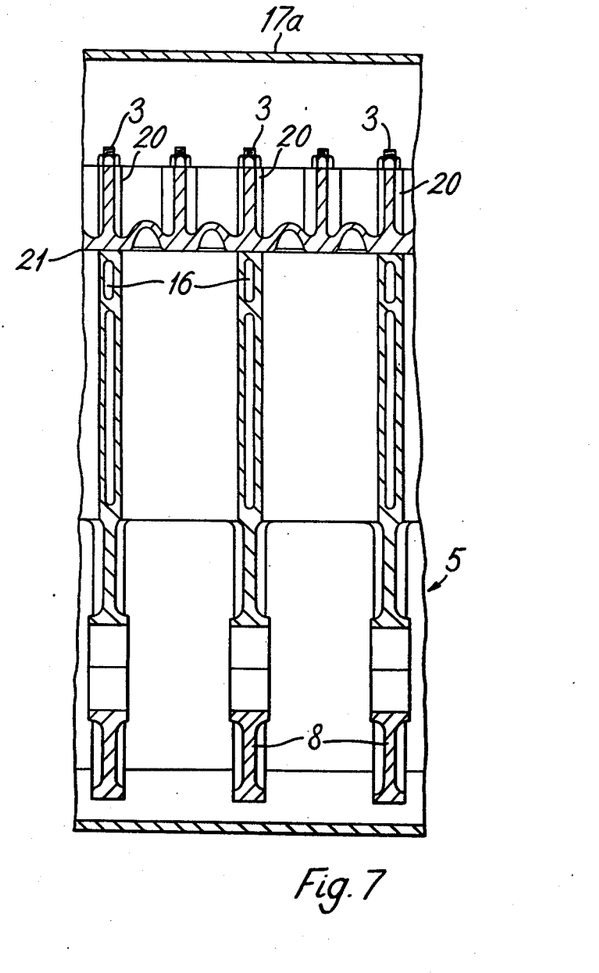
FIG. 7 is a section on the line VII—VII in FIG. 1.
Figure 9:
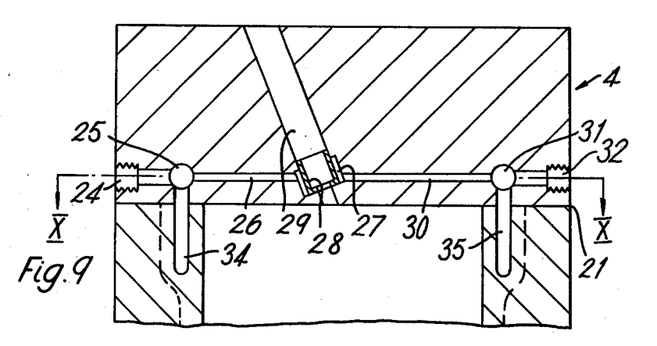
FIG. 9 is a more detailed section through part of a cylinder and cylinder head, according to the present invention, and showing the cooling system.
Figure 10:
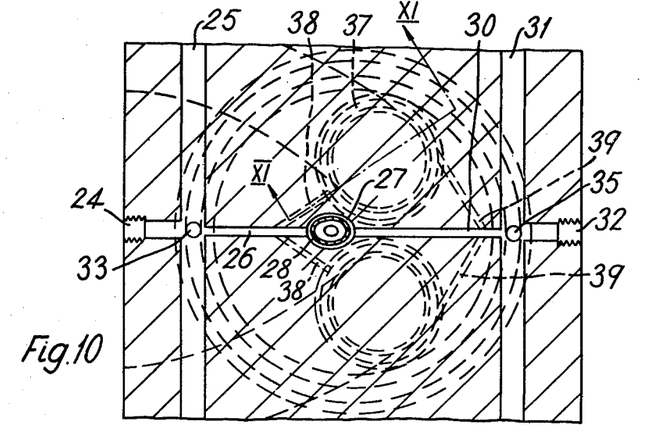
FIG. 10 is a section on the line X—X in FIG. 9.
Figure 11:
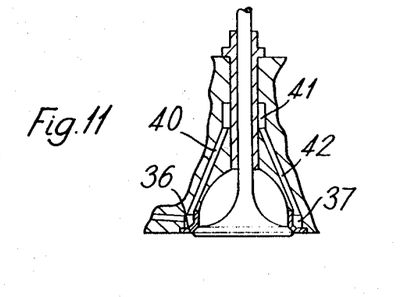
FIG. 11 is a section on the line XI—XI in FIG. 7.

FIGS. 9, 10 and 11 show localised cooling arrangements in accordance with the invention. In FIGS. 7 and 8, cooling water passes via an inlet connection 24 to a header 25 in cylinder head 4. This header serves several cylinders and from it the water passes to each cylinder via a passage 26 to an annular passage 27 surrounding a sleeve 28 at the end of a bore 29 which houses a fuel injection nozzle holder (not shown). An outlet passage 30 conveys the water to the common outlet main 31 and thence via a connection 32 to the external cooling system. The flow of water in passage 27 cools both the fuel injection nozzle and the adjacent critical area of those parts of the plate 17 which constitute part of the combustion chamber wall.

In a parallel circuit water from the header 25 passes via an inlet hole 33 into an annular passage 34 which surrounds the end of the cylinder bore. The water flow divides on entering the annular passage and rejoins at an outlet hole 35.

To cool the valve seats and valves, seat inserts 36, FIG. 11, are provided, each of which encloses an annular space 37 through which water is passed via passages 38 and 39, FIG. 10, forming circuits parallel to that which cools the nozzle. An additional parallel circuit for cooling each valve guide and valve stem is formed by inlet passage 40, cooling annulus 41 and outlet passage 42, as shown in FIG. 11.

I claim:
1. An internal combustion engine comprising:
a cylinder block,
a plurality of cylinders disposed within said block, each including a cylinder head member and having parts liable in use to overheat, namely means for injecting fuel, a valve seat member, a valve guide member and a small section of the length of the cylinder wall adjacent the head member, less deep axially than the combustion zone;
said block and head member having a small bore annular duct formed about at least one of said parts and said block and head member having passages connect- ing said annular ducts in a path between a cooling fluid source and a cooling fluid outlet, said passages comprising only the minimum fluid passages necessary to conduct sufficient fluid directly to and from said annular ducts so as to cool said overheating parts, the remainder of said block and head member including no ducts exclusively for cooling creating substantial cooling effect and situated in use in the path of fluid flow between a source and an outlet for cooling fluid.

2. An internal combustion engine according to claim 1 in which:
said cylinder head structure includes valve seats and an injector nozzle orifice for each cylinder, and
said annular ducts closely surround said seats and said orifice.

3. An internal combustion engine according to claim 2 in which:
said cylinder head structure also includes valve guides associated with said valve seats, and
said cooling system also includes annular ducts closely surrounding parts of said valve guides likely in use to overheat.

4. An internal combustion engine according to claim 1 in which said cooling system also includes annular fluid ducts closely surrounding the part of each said cylinder closest to its combustion zone, said fluid flow cooling ducts being absent from all other parts of said internal combustion engine.

5. An internal combustion engine comprising p1 a cylinder block,
a plurality of cylinders disposed within said block each including a cylinder head member and having parts liable in use to overheat, namely means for injecting fuel, a valve seat member, a valve guide member and a small section of the length of the cylinder wall adjacent the head member, less deep axially than the combustion zone;
said block and head member having a small bore cooling duct formed in close proximity with at least one of said parts and said block and head member having passages connecting said ducts in a path between a cooling fluid source and a cooling fluid outlet, said passages comprising only the minimum fluid passages necessary to conduct sufficient fluid directly to and from said ducts so as to cool said overheating parts, the remainder of said block and head member including no ducts exclusively for cooling creating substantial cooling effect and situated in use in the path of fluid flow between a source and an outlet for cooling fluid.

* * * * *